United States Patent [19]

Kennedy et al.

[11] Patent Number: 4,914,166
[45] Date of Patent: Apr. 3, 1990

[54] NON-FOULING LIQUID NITROGEN COOLED POLYMERIZATION PROCESS

[75] Inventors: Joseph P. Kennedy, Akron, Ohio; Miklos Zsuga, Debrecen, Hungary

[73] Assignee: The University of Akron, Akron, Ohio

[21] Appl. No.: 145,962

[22] Filed: Jan. 20, 1988

[51] Int. Cl.$^4$ .............................. C08F 2/02; C08F 2/06
[52] U.S. Cl. ..................................... 526/61; 526/59; 526/74; 526/236; 526/237; 526/238; 526/348.7; 528/393; 528/425
[58] Field of Search ................... 526/236, 237, 74, 61, 526/59, 238, 348.7; 62/4; 528/393, 425

[56] References Cited

U.S. PATENT DOCUMENTS 2,474,670 6/1949 Hersberger et al. ................. 526/237
2,485,454 10/1949 Nelson et al. ........................ 526/236

OTHER PUBLICATIONS

J. Roussel, The Use of Liquid Nitrogen for Heat Control of Chemical Reactions, Chimie et Industrie-Génie Chimique, 106(7), 483-493, (1973).
Nassler, "Experimental Techniques for Low-Boiling Solvents", in the Chem. of Non-Aqueous Solvents, J. Lagowski (ed.), Academic Press, N.Y., (1966), p. 218.

*Primary Examiner*—Joseph L. Schofer
*Assistant Examiner*—F. M. Teskin
*Attorney, Agent, or Firm*—Oldham & Oldham Co.

[57] ABSTRACT

A non-fouling economical liquid cooled cryogenic polymerization process is disclosed for essentially olefinic monomers. The heat of cooling and polymerization is removed by evaporation of the liquid nitrogen and the nitrogen vapors eliminate the need for moisture traps and drying agents to block the in flow of said moisture.

24 Claims, 1 Drawing Sheet

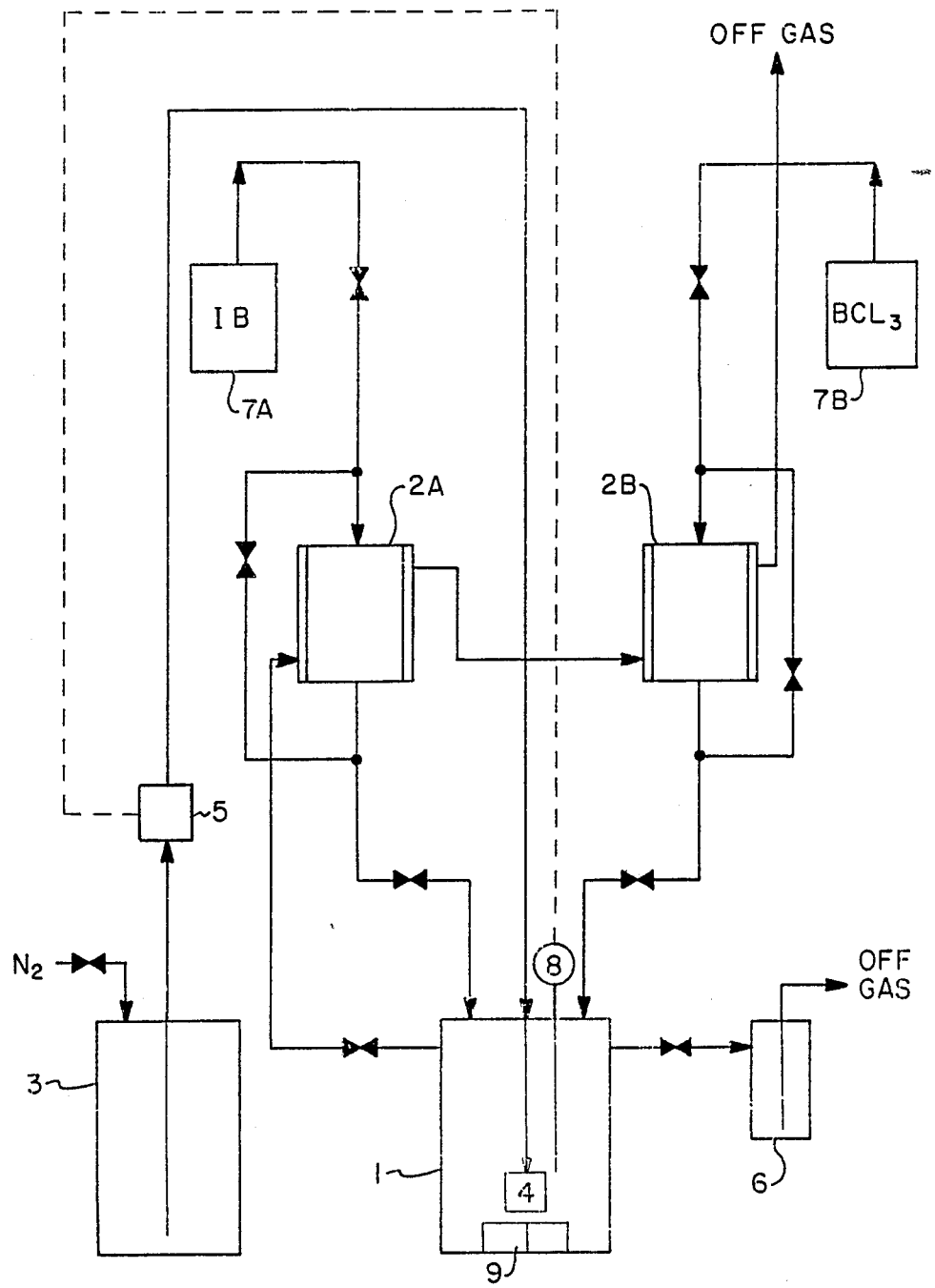

NON-FOULING LIQUID NITROGEN COOLED POLYMERIZATION PROCESS

FIELD OF INVENTION

This invention relates to a method for polymerizing monomers under cryogenic conditions with carbocationic catalyst by charging said monomer or monomers with or without a solvent or solvents to a reactor, chilling said monomer to cryogenic polymerization temperature with liquid nitrogen contacting said monomer or monomers with a carbocationic catalyst to cause polymerization to occur and thus generate heat and removing said generated heat by evaporation of the liquid nitrogen to maintain the cryogenic polymerization temperature. More particularly this invention relates to an apparatus for economically effecting cryogenic polymerization of monomers, particularly those that tend to evaporate or boil at ambient to slightly higher temperature unless held under sufficient positive pressure, maintain said cryogenic polymerization temperature and remove the heat of polymerization by evaporation of liquid nitrogen to maintain a positive pressure on the reactor at the desired temperature. This apparatus is capable of both batch and continuous operation.

BACKGROUND ART

The polymerization of monomers using Friedel-Crafts syntheses technique and cationic polymerization frequently require cryogenic polymerization temperatures. In small scale operations, i.e. in laboratories, elaborate dry box systems are desirable together with cryogenic cooling by either an internal or an external heat exchange system. On the other hand, in pilot plant and commercial operations, the equipment required becomes very costly due to the need for refrigeration equipment, external and internal heat exchangers, pumps as well as stirrers. Not only is this apparatus costly and relatively bulky but severe problems are experienced with fouling and plugging of the reactor and stirrers. Although these problems have existed for many decades, little progress has been made in solving the cooling or removal of the heat of polymerization and the fouling, or plugging problems.

The failure of those of ordinary skill or expert in the cryogenic polymerization art to solve these and other problems is amazing when it is understood that the Leidenfrost principle has been known for several decades or longer. Yet, the only utilization thereof known to us was of the type described by J. Roussel, in 1973 in Volume 105 "Chimie et Industre Genie," page 483. Roussel only taught simple reaction systems like the chlorination of ethylene or the nitration of acetanilide. Although Roussel discloses its use in preparing pharmaceuticals from bacterial sources, he further discloses problems were experienced with blockage or plugging the orifices in the nitrogen supply orifice.

In retrospect the failure of those of ordinary skill or those expert in the cryogenic polymerization art to utilize the cheap liquid nitrogen that has been on the market from liquid oxygen plants built to supply oxygen to more modern steel furnaces is amazing.

BRIEF DESCRIPTION OF THE DRAWING

The sole FIGURE depicts a liquid nitrogen cooled polymerization system in accordance with the present invention.

DISCLOSURE OF THE INVENTION AND ITS BEST MODES

This invention can be practiced in the laboratory, pilot and commercial scale by simply appropriately sizing the reactors whereas according to the prior cryogenic polymerization techniques this was not so easily accomplished for the equipment varied appreciable from stage to stage. For laboratory operation a 1 to 5 liter reactor can be fitted with a dispersion unit or a tube to feed the liquid nitrogen to the reactor a thermocouple and regulator to control the feed of the liquid nitrogen from a tank of liquid nitrogen together with tubes to feed the monomer with or without solvent and the catalyst to the reactor.

As the reactor is scaled to about 12 or more liters for pilot operations the amount or size of the liquid nitrogen container feed tubes etc. are enlarged accordingly. Then for a commercial operation the reactor is scaled for the volume of production desired with the liquid nitrogen being provided by tankers or more desirable locating the commercial plant across the fence from a liquid air plant such as those frequently found at steel furnace locations. Thus, this invention provides a reactor system for using the cheap liquid nitrogen available and eliminates the need for extensive heat exchangers, refrigeration plant, pumps and stirrers. Also, no evidence of reactor fouling has been observed.

The monomers useful in this invention are generally unsaturated olefins such as the alpha olefins and the diolefins of either the conjugated or nonconjugated types and they may contain from 2 to about 20 carbon atoms and preferably about 4 to 12 carbon atoms. The monomers like the alkylene oxides such as ethylene oxide and propylene oxide may be used to form polyalkylene oxide polymers or copolymers such as the polyether polyols.

The catalysts useful in this invention are the well known Friedel-Craft catalyst such as the halides of boron, aluminum, titanium, tin, iron, etc. with chlorine or bromine being the ones generally used. The solvents may be any of those used in cyrogenic polymerizations that generally boil below about 50° C. to about 20° C. and are liquids at the cryogenic polymerization temperature which generally is about $-80°$ to $-10°$ C. These extremely low temperatures require the solvent not to freeze or solidify when liquid nitrogen is bubbled through the solvent in the cryogenic polymerization range.

Recently, we and our associates have discovered new polymerization systems that use broadly the Lewis acids together with organic acids and their esters or ethers to form complexes that forms supernonnucleosphillic counter anions that yield living polymerization systems at temperatures below the complex decomposition temperature. These new polymerization systems are described in U.S. patent applications Ser. No. 746,835 filed June 20, 1985 by Joseph P. Kennedy et al. and Ser. No. 899,655 filed Aug. 25, 1986 by Joseph P. Kennedy et al, both now abandoned.

The amount of solvent on a weight percent of monomer can vary from 0 to 100% or more. Thus, as little as 1 to 2% to about 20 to 50% can be used to adjust the viscosity and solubility of the polymer solution, if desired or to maintain the catalyst in solution. It should be appreciated that the more solvent used, the more solvent has to be removed and recovered in isolation of the polymer. Isolation of the polymer may be by any of the well known methods of removing the solvent from the polymer solution. Generally, an excellent and effective way is to feed the polymerization solution with steam to a gorator to flash off the solvent and drop the polymer as crumb on a screen to free the crumbs of excess water. Then the crumb is dropped to an extruder to drive off any remaining solvent and dry the crumb to provide the polymer in strips, sheets, etc. for packaging or use.

The nature of this invention and its advantages can be understood readily by reference to the schematic drawing where the numeral 1 designates a reactor of the appropriate size for the operation, i.e. laboratory, pilot and commercial operation. The reactor has tubes or pipes to feed the monomer the catalyst and the liquid nitrogen, and, optionally the solvent where it is not mixed with the monomer, to the reactor. In some instances, it may be advantageous to equip the reactor with a mechanical stirrer 9, or a magnetic type stirrer as this eliminates the need for stirrer seals.

The monomer such as isobutylene, hereafter sometimes designated as IB is driven off the IB evaporator 7A to pass through a jacketed dropping funnel 2A or some other feed measuring device, such as the well known metering pumps. The passage of the vapors of IB through the jacketed dropping funnel 2A is converted to a liquid by the nitrogen vapors from the reactor as the IB drops or flows into the reactor 1 through the IB feed pipe. Liquid nitrogen from the liquid nitrogen tank 3 which preferably has features similar to a Dewar flask or tank is pressure fed to the reactor 1 by the opening of magnetic valve 5 in response to the impulse from the thermocouple and its regulator 8. The liquid nitrogen flows to or near the bottom of reactor 1 where the nitrogen pipe terminates in a dispersion unit 4. The dispersion unit usually contains a series of small holes in the pipe to cause the liquid nitrogen to contact the liquid in the reactor as essentially small streams or jets and thus break into a multitude of small droplets. These droplets are vaporized in contact with the reactor liquid to intimately mix the monomer and catalyst and remove the heat of polymerization as the liquid nitrogen is converted to gaseous nitrogen.

The gaseous nitrogen is removed by the lines to the dropping trap 6 or the jacketed dropping funnels 2A and B or by the action of a pump (not shown) or due to the pressure differential between the reactor and the atmosphere. The dropping trap 6 can be used to draw off the polymerization mixture, especially in continuous operation, to work up and to recover the polymer.

The catalyst is transferred from the catalyst hold tank 7 through jacketed dropping funnel 2B into the reactor 1.

Where the reactor is of the laboratory to pilot plant size the following component parts can be used: (1) the dispersion tube 4 may be a glass bulb with several holes therein with five holes being preferred, (2) the stirrer may be a labglass spinstar LG-9558T, (3) the magnetic valve may be a Gilmore 8263205LT, (4) the thermocouple may be an Omega HPS-RT-K-18G-12 and (5) the regulator may be an Omega CN7000.

A major benefit of the liquid nitrogen cooled reactor is the ease and high rate it is able to compensate for sudden large temperature jumps or surges. These temperature surges were a significant problem with the prior art apparatus. The area of the cooling surfaces in conventional reactors are necessarily limited and faster cooling can be achieved only by increasing the circulation rate of the coolant in the cooling jackets or coils. In the prior art installations the maintenance of constant low temperatures may not even be possible in case of excessively rapid, massive heat build-ups. In contrast, in the liquid nitrogen cooled reactor the area of cooling surfaces (number of liquid nitrogen [LN$_2$]droplets) can be virtually instantaneously increased in response to rapid temperature jumps by increasing the rate of coolant input. Also, the LN$_2$ cooling "surface" is in virtual contact with the heat source so that the length of heat transfer is minimum. The flow rate of the coolant can be automatically regulated by connecting the input valve to a temperature sensing device as shown in the drawing.

Another great advantage of the reactor is that reactor "fouling" cannot occur. Fouling is the gradual accumulation of polymer solids on the cooling surfaces during operation which leads to a gradual reduction of cooling efficiency and ultimately to costly reactor shut-down. The cleaning of cooling surfaces is a cumbersome time-consuming operation. Fouling is quite common, for example, in butyl rubber manufacture where fouling necessitates the use of more than one (usually three) parallel reactors to ensure continuous operation: while one of the reactors is shut down for cleaning the rest are in operation. Our experience is that the liquid nitrogen cooled reactor essentially eliminates the polymer solids fouling problem.

Finally, the vaporizing liquid nitrogen also provides a blanket of inert gas which, particularly in smaller scale (pilot plant) operations, may be quite advantageous to protect moisture-sensitive charges.

The nature of this invention and its advantages may be understood better by reference to the following representative examples where all parts and percentages are on a weight basis.

EXAMPLE 1

Polymerization of Isobutlene by the Use of a Liquid Nitrogen Cooled Reactor

A liquid nitrogen cooled reactor as shown in the drawing was used in isobutylene polymerizations using a recently developed "living" initiating system i.e., dicumyl acetate/BCl$_3$ and methylene chloride as diluent at $-60°$ C. (J. P. Kennedy articles, *Advances In Chemistry*, Ser. No. 34, 111, 1962 and *Journal of Polymer Science and Polymer Chemistry*, Ed., 25, 1847, 1987).

A diluent (CH$_2$Cl$_2$, 1500 mL) and initiator dicumyl acetate (1.37 g, 0.005 mole) were charged into reactor 1. The charge was cooled to $-60°$ C. and agitated by the direct introduction of liquid nitrogen into the reactor. The coolant was delivered pneumatically from a liquid nitrogen Dewar container 3 and its flow rate was automatically regulated by the magnetic off-and-on valve 5 connected to the temperature regulator-sensor 8. The charge was cooled from ambient to $-60°$ in about 25 minutes, and subsequently the temperature was maintained to $\pm 1°$ C. of $-60°$ C.

The monomer (isobutylene, 23.5 g, 0.42 mole) and coinitiator (BCl$_3$, 14.6 g, 0.12 mole) were vaporized from the evaporators 7 A and B and condensed into the jacketed dropping funnels 2A and B. When the working temperature is under $-50°$ C. the off-gas, i.e. exiting gaseous N$_2$ provides sufficient cooling to liquefy the monomer and coinitiator. However, if the temperature is higher than $\sim -50°$ C., a trap 6 should be used. The exiting cold N$_2$ gas cools the trap 6 below the dew point and thus prevents moisture back-diffusion from the atmosphere. The use of drying tubes is unnecessary (indeed they may create problems by increasing the pressure in the reactor).

After the liquefied IB is introduced into the reactor the polymerization is started by rapidly adding the liquefied $BCl_3$ coinitiator to the charge. Polymerization occurs instantaneously and is perceived by a faster boiling of the liquid $N_2$. In contrast to conventional operations, a temperature jump was not observed. After the desired polymerization time (15 mins) the reaction is quenched by the addition of prechilled methanol (100 mL) through one of the dropping funnels 2. The characteristic pale yellow color of the active polymerization charge is instantaneously discharged. After a few additional minutes the feeding of $LN_2$ is discontinued and the charge is allowed to warm to ambient. The routine polymer work-up procedure of coagulation of the polymer was used and congulum was dried in a warm air oven.

In the above specific example conversion was 100%, with polyisobutylene PIB having a $M_n = 8200$ and $M_w/M_n = 2.4$. According to $^1H$ NMR spectroscopic analysis the expected aromatic initiator residue (resonance at 7.2 ppm) has been incorporated into the PIB chain.

EXAMPLE II

The liquid nitrogen cooled reactor of the drawing was used to make a polymerization at $-35°$ C. by charging the reactor with 21 parts of isobutylene and about 10 parts of initiator dissolved in 300 parts of methylene dichloride and cooling to $-35°$ C. with liquid nitrogen. The polymerization was initiated by adding 7 parts of boron chloride in a solution of methylene chloride to the reactor which is intimately mixed by the bubbles of gaseous nitrogen formed from the liquid nitrogen. This addition starts the polymerization. After about 30 minutes the polymerization is stopped by addition of pre-cooled methanol and the polymer recover by coagulation and drying to remove the solvent and moisture.

Another run was made at $-60°$ C. and the polymer had a $M_n = 2897$ and no reactor fouling was experienced.

The above polymerization may be practiced without regard to the sequence of addition of the ingredients to the reactor so long as the ingredients are cooled to the cryogenic temperature prior to the time the catalyst contacts the monomer.

This polymerization process avoids the fouling associated with the prior art processes which is particularly bad with the butyl rubber polymerization.

While in accordance with the patent statutes only the best mode and preferred embodiment of the invention has been illustrated and described in detail, it is to be understood that the invention is not limited thereto or thereby, but that the scope of the invention is defined by the appended claims.

What is claimed is:

1. A method of polymerizing under cryogenic conditions a monomer or monomers with a carbocationic catalyst comprising charging a charge of said monomer or monomers with or without solvent to a reactor, chilling said charge to cryogenic polymerization temperature by the evaporation of a controlled feed of liquid nitrogen, contacting said charge with a carbocationic catalyst to effect said polymerization to thereby generate heat, removing the said heat by the evaporation of said controlled feed of liquid nitrogen to maintain the cryogenic polymerization temperature, said liquid nitrogen feed and removal of said heat by the evaporation of said controlled feed of liquid nitrogen being controlled by magnetic on and off valves which open and close in response to temperature variations in the reactor measured electrically and the evaporation of said feed of liquid nitrogen being able to maintain an inert nitrogen atmosphere in said reactor at or above atmospheric pressure.

2. The method of claim 1 wherein charging of liquid nitrogen and its evaporation is controlled to maintain the temperature essentially constant responsive to the heat generated.

3. The method of claim 1 wherein the polymerization is continuous and the monomer is continuously charged to the reactor and the polymerization product is continuously withdrawn.

4. The method of claim 1 wherein the monomer is an alkylene oxide.

5. The method of claim 1 wherein the polymerization occurs in the absence of a diluent.

6. A method of effecting polymerization in a reaction zone under cryogenic conditions comprising charging to said zone at least one or more monomers with or without a diluent, cooling the monomer to cryogenic temperature desired by evaporation of a controlled feed of liquid nitrogen charged to said zone through a dispersion unit, said unit causing separation of the liquid nitrogen into essentially small streams or jets that break into small droplets, said droplets contacting said monomer and/or any diluent present to effect cooling to desired cryogenic temperature, charging a carbocationic catalyst to said zone to effect polymerization and controlling charge of liquid nitrogen relative to monomer, or diluent, charge rate and polymerization to control the temperature at desired cryogenic temperature, said liquid nitrogen feed being controlled by magnetic on and off valves which open and close in response to temperature variations in the zone measured electrically and the evaporation of said controlled charge of liquid nitrogen being able to maintain an inert nitrogen atmosphere in said reactor at or above atmospheric pressure.

7. The method of claim 6 wherein charging of liquid nitrogen and its evaporation is controlled to maintain the temperature essentially constant responsive to the heat generated.

8. The method of claim 6 wherein the polymerization is continuous and the monomer is continuously charged to the reactor and the polymerization product is continuously withdrawn.

9. The method of claim 6 wherein each of the one or more monomers is an olefin.

10. The method of claim 6 wherein the one or more monomers is an alkylene oxide.

11. The method of claim 6 wherein the polymerization occurs in the absence of a diluent.

12. A method of effecting polymerization in a reaction zone under cryogenic conditions comprising charging to said zone at least one or more monomers with or without a diluent, cooling the monomer to cryogenic temperature desired by the evaporation of liquid nitrogen charged to said zone through a dispersion unit to effect separation of the liquid nitrogen into essentially small streams or jet streams that break into small droplets, said droplets contacting said monomer and/or any diluent present to effect cooling to desired cryogenic temperature, charging a carbocationic catalyst, consisting of a complex of a Lewis acid with an ester of an organic acid or an ether to effect a living polymerization, to said zone to effect polymerization and controlling charge of liquid nitrogen relative to monomer, or diluent, charge rate and polymerization to control the temperature at desired cryogenic temperature.

13. The method of claim 12 wherein charging of liquid nitrogen and its evaporation is controlled to maintain the temperature essentially constant responsive to the heat generated.

14. The method of claim 12 wherein the charges of liquid nitrogen are controlled by valves in response to temperature variation in the reactor measured electrically to send a signal to motors to operate said valves to effect said charge and said evaporation of liquid nitrogen to control pressure on said reactor above atmospheric.

15. The method of claim 12 wherein the polymerization is continuous and the monomer is continuously charged to the reactor and the polymerization product is continuously withdrawn.

16. The method of claim 12 wherein each of the one or more monomers is an olefin.

17. The method of claim 12 wherein the one or more monomers is an alkylene oxide.

18. The method of claim 12 where the polymerization occurs in the absence of a diluent.

19. A method of effecting polymerization in a reaction zone under cryogenic conditions of at least one or more monomers with or without a diluent at a desired cryogenic temperature in the presence of a carbocationic catalyst to generate heat of polymerization, removing said heat of polymerization to maintain the desired cryogenic temperature by evaporation of a controlled feed of liquid nitrogen charged to said zone through a dispersion unit to effect separation of the liquid nitrogen into essentially small streams or jets that break into small droplets, said droplets evaporating in contact with said monomer and/or any diluent present to effect cooling to maintain desired cryogenic temperature, said liquid nitrogen feed being controlled by magnetic on and off valves which open and close in response to temperature variations in the reaction zone measured electrically and the evaporation of said controlled feed of liquid nitrogen being able to maintain an inert nitrogen atmosphere in said zone at or above atmospheric pressure at polymerization temperature.

20. The method of claim 19 wherein charging of liquid nitrogen and its evaporation is controlled to maintain the temperature essentially constant responsive to the heat generated.

21. The method of claim 19 wherein the polymerization is continuous and the monomer is continuously charged to the reactor and the polymerization product is continuously withdrawn.

22. The method of claim 19 wherein each of the one or more monomers is an olefin.

23. The method of claim 19 wherein the one or more monomers is an alkylene oxide.

24. The method of claim 19 where the polymerization occurs in the absence of a diluent.

* * * * *